United States Patent [19]

Pastor

[11] Patent Number: 4,680,044
[45] Date of Patent: Jul. 14, 1987

[54] METHOD OF MODIFYING THE REFRACTIVE INDEX OF FLUORIDE GLASS

[75] Inventor: Ricardo C. Pastor, Manhattan Beach, Calif.

[73] Assignee: Hughes Aircraft Company, Los Angeles, Calif.

[21] Appl. No.: 801,666

[22] Filed: Nov. 25, 1985

[51] Int. Cl.$^4$ ............................................. C03B 37/027
[52] U.S. Cl. ............................................. 65/3.11; 65/17; 65/134; 65/DIG. 16; 501/30; 423/72; 423/76; 423/492
[58] Field of Search ............... 65/3.11, 17, 134, 136, 65/DIG. 16, 2; 423/72, 76, 492; 501/30

[56] References Cited

U.S. PATENT DOCUMENTS

| | | | |
|---|---|---|---|
| 4,388,097 | 6/1983 | Turk et al. | 65/DIG. 16 |
| 4,504,300 | 3/1985 | Gauthier et al. | 65/13 X |
| 4,537,864 | 8/1985 | Tick | 501/30 |
| 4,578,252 | 3/1986 | Pastor et al. | 423/76 |

FOREIGN PATENT DOCUMENTS 59-137329  8/1984  Japan ...................... 65/DIG. 16

Primary Examiner—Robert Lindsay
Attorney, Agent, or Firm—Wanda K. Denson-Low; A. W. Karambelas

[57] ABSTRACT

The present invention relates to a method of producing a fluoride glass preform and/or fiber having a modified refractive index by heating the fluoride glass preform to a temperature that is above its glass transition temperature, but below its devitrification temperature; inserting a first electrode into the inner core of the preform and surrounding the outer perimeter of the preform with a second electrode of opposite polarity; means for generating an electromotive force; and applying an electromotive force through the first electrode and the second electrode which causes a movement of positive ions toward the electrode of opposite charge while simultaneously causing a movement of negative ions toward its electrode of opposite charge such that the movement of these ions results in a modification of the refractive index of the preform.

9 Claims, 4 Drawing Figures

METHOD OF MODIFYING THE REFRACTIVE INDEX OF FLUORIDE GLASS

TECHNICAL FIELD

The present invention relates to a method of modifying the refractive index of fluoride glass. More particularly, the present invention relates to a method of modifying the refractive index of fluoride glass at the bulk preform stage or at the fiber drawing stage.

BACKGROUND OF THE INVENTION

Heavy metal fluoride glasses, such as fluorozirconate and fluorohafnate glasses have chemical and physical characteristics which make them ideally suited for a wide variety of optic applications. Multicomponent fluoride glasses, a relatively new class of materials, were first reported by French researchers, M. Chanthanasinh in 1976 and Poulain et al in 1977. These early glasses exhibited strong and very broad IR absorptions near 3 microns due to $OH^-$ contamination and were of poor optical quality due to density gradients, haziness, and precipitated material.

Two problems have plagued the use of fluoride glasses in optic applications, light absorption and light diffraction, both of which relate directly to light transmission. The problem of light absorption is tied to the presence of cation and anion impurities. Many purification methods have attempted to alleviate this problem.

One such method is disclosed by Mitachi and Miyashita, in Elect. Lett., 18, 170 (1982). A "build-in-casting" method is disclosed wherein the cladding glass melt is cast into a cylindrical brass mold, which has been preheated at about glass transition temperature. The melt in the central part of the mold was allowed to flow out, and the core glass melt was instantly cast into the central cylindrical hollow part and annealed. The $ZrF_4:BaF_2:GdF_3:AlF_3$ (ZBGA) fluoride glass produced by Mitachi and Miyashita demonstrated a measured loss at IR wavelengths of only 21 dB/km at 2.55 μm. Their IR transmission loss spectrum and their estimated impurity concentration data (pg. 170 of the above article), indicate that the measured losses at IR wavelengths are caused by the residual impurities present in the glass, particularly, the cations $Fe^{2+}$, $Cr^{3+}$, $Ni^{2+}$ and the anion, $OH^-$. (refer to FIG. 1 of the instant application). Please note that this reference is in error in that the description and caption associated with FIG. 2, in fact describes FIG. 1 of said reference (as reproduced in FIG. 1 of the instant application). Therefore, the transition ion content, namely $Fe^{+2}$, $Cu^{+2}$, $Ni^{+2}$, and $Cr^{+3}$, must be in the parts per billion range and the anion impurity levels, namely $OH^-$ and $O^{-2}$, must also be correspondingly low, in order to achieve the desired IR transmission characteristics.

Many other purification processes have emerged in order to combat the inherent lack of purity which is common to all fluoride materials. Generally, the approach to obtaining pure optic fibers was to purify the starting materials. Reactive atmosphere processing was one method utilized to purify metal fluorides. Examples of this type of processing are illustrated in U.S. Pat. Nos. 3,826,817, 4,519,986 and 4,341,873, all of which are assigned to the present assignee. Processes such as these were very effective in reducing the anion impurity concentration of commercially available zirconium and hafnium tetrafluorides. Removal of the cation impurities present in commercially available zirconium and hafnium tetrafluorides, however, proved exceedingly more difficult.

Typically, sublimation and distillation techniques were effective in removing most of the cation impurities found in commercially received material. Techniques such as sublimation and/or distillation, however, have only been partially effective in removing Fe impurities, due to the relatively high vapor pressure of $Fe^{+3}$ (as $FeF_3$) in the matrix of heavy metal fluorides. These separation techniques are satisfactory for removing most of the cation impurities found in commercially received material, such as the alkaline earth and 4f impurities. However, sublimation and/or distillation have been only partially effective in removing Fe impurities due to the relatively high vapor pressure of $Fe^{+3}$ as $FeF_3$ in the fluoride matrix.

During sublimation or distillation of the zirconium or hafnium tetrafluoride, the concentration of impurities increases in the remaining solid or liquid material so that vaporization of the $Fe^{+3}$ begins to occur along with the zirconium or hafnium tetrafluoride to thereby contaminate the sublimate. In order to prevent iron from contaminating the sublimate or distillate, it is necessary to stop the sublimation or distillation after only part of the material has been vaporized. This is undesirable, of course, since the residue must be discarded even though a high percentage of the metal tetrafluoride remains in the residue. As a result, a substantial waste of the material occurs. Further, the degree of purity obtainable by sublimation or distillation alone, does not reduce the Fe content into the ppb range, ie., below 1 part per million (ppm).

Accordingly, U.S. Pat. No. 4,578,252 discloses a method of purifying metal tetrafluorides to produce ultra pure metal tetrafluorides having iron impurity concentrations of below 500 ppb. This method combines electromotive series displacement (ESD) with direct melt electrolysis (DME). More specifically, an electromotive force is applied to the metal tetrafluoride during and preferably prior to distillation or sublimation. The electromotive force is applied to the metal tetrafluoride to electrically plate out relatively volatile iron (Fe) cation impurities. Either of the two processes (ESD or DME) can combine synergistically with distillation or sublimation to produce a distillate or sublimate which has a much lower Fe cation content than that achievable of either sublimation and/or distillation alone. Electromotive series displacement (ESD) and the direct melt electrolysis (DME) method appear to be the best means available for reducing the transition ion impurities ($Fe^{+2}$, $Cu^{+2}$, $Ni^{+2}$, $Cr^{+3}$, etc.) and anion impurities ($OH^-$ and $O^{-2}$) of fluoride glass, i.e. 1–500 ppb, however, even this method has not completely eliminated these impurities from the fluoride glass material. Because the purification method is applied separately to each component, the impurity degradation results from their mixing, fusion, and quenching to form the fluoride glass. At present, there are no containers, which can suitably interface with the fluoride melt and that are themselves pure at the desired ppb level. Hence, leaching is the problem which accounts for some residual impurities, not the purification method.

Another problem associated with fluoride glass materials is light transmission. In order to effectuate a high level of efficient light transmission through fluoride glass materials, three problems must be solved. Firstly, the absorption of light by the fluoride glass material must be as low as possible. The property of light absorption is controlled by the impurity levels present. Secondly, the level of scattering, caused by small particles or voids in the medium (glass), must also be low. This problem can be solved by carefully choosing the amounts of the requisite components that make up the fluoride glass composition and insuring that the fluoride glass preform is a homogeneous medium. Lastly, diffraction of the light beam outside of its intended path must be minimized.

Fluoride glass is of great importance because of its potential use as a fiber optic material. Obviously, light transmission, particularly diffraction, is a critical factor in enabling the fluoride glass material to operate more effectively. A certain fraction of the light beam as it enters an optic fiber would generally be diffracted outside of the fiber. This would clearly decrease the light transmission of the fiber and decrease the fiber's effectiveness in optic applications. A fiber having greater light transmission efficiency would enable light to be transmitted over greater distances between terminals where it could be amplified before its intensity is degraded to a level where the information it carried became garbled by noise.

SUMMARY OF THE INVENTION

The present invention relates to a method of modifying the refractive index of a fluoride glass preform having an outer periphery and an inner core comprising:
(a) heating the fluoride glass preform to a temperature that is above its glass transition temperature, but below its devitrification temperature;
(b) inserting a first electrode into the inner core of the preform and surrounding the outer perimeter of the preform with a second electrode of opposite polarity;
(c) generating an electromotive force using a generating means; and
(d) applying an electromotive force through the first electrode and the second electrode which causes a movement of positive ions toward the electrode of opposite charge, while simultaneously causing a movement of negative ions toward its electrode of opposite charge, such that the movement of these ions results in a modification of the refractive index of the preform.

As a feature of the present invention, the use of electrolysis at the preform stage can modify the refractive index of such preform.

As a feature of the present invention, the use of electrolysis at the preform stage can induce a higher refractive index at the core of the preform than at its outer periphery. This thereby produces an optic fiber that is considerably more light transmission efficient.

As another feature of the present invention, the refractive index of the preform may be modified to a desired level by changing the symmetry and/or the configuration of the electrodes to correspond to a preform symmetry that is other than the conventional cylindrical case.

This and other additional features and advantages of the present invention will become apparent from the following drawings and detailed description of the invention.

DETAILED DESCRIPTION OF THE INVENTION

As was stated previously, light transmission is an important problem that is encountered whenever the use of fluoride glass materials for optic applications is contemplated. The light transmission of fluoride glass is dependent upon three properties, light absorption, light scattering and light diffraction. Light absorption, which is tied to the presence of cation and anion impurities, was substantially solved by processes such as ESD or DME, discussed in depth previously. The present invention deals with solving the light diffraction problem.

The present invention is a method of producing a fluoride glass preform and/or fiber having a modified refractive index. In order for a fluoride glass medium to exhibit effective light transmission properties, diffraction of the light beam outside of its intended path must be minimized. The method of the present invention solves this problem by creating a higher refractive index at the core of the preform than at its surrounding periphery. Previously, once a preform was produced it was difficult, if not impossible to change any of its properties without destroying or altering the composition of the host ions.

Through the use of the present invention, the refractive index of a fluoride glass preform and/or fiber can be modified to a desired level through the use of an electromotive force and by varying the symmetry and/or configuration of the electrodes. Through the use of the present invention, the core of the fiber can be modified to have a higher refractive index than its surrounding periphery, a component of the light beam which strays away from the center axis, approaches the low-refractive-index region below the critical angle and is thereby bent back towards said axis. The critical angle is that angle of incidence, i, of a ray of light at which it is refracted through a prism such that its angle of emergence is 90°, i.e., $\sin i = 1/n$, where "n" is the refractive index.

Therefore, the present invention relates to a method of modifying the refractive index of a fluoride glass preform having an outer periphery and an inner core comprising:
(a) heating the fluoride glass preform to a temperature that is above its glass transition temperature, but below its devitrification temperature;
(b) inserting a first electrode into the inner core of the preform and surrounding the outer perimeter of the preform with second electrode of opposite polarity;
(c) generating an electromotive force using a generating means; and (d) applying an electromotive force through the first electrode and the second electrode which causes a movement of positive ions toward the electrode of opposite charge, while simultaneously causing a movement of negative ions toward its electrode of opposite charge such that the movement of these ions results in a modification of the refractive index of the preform.

Figure 3:
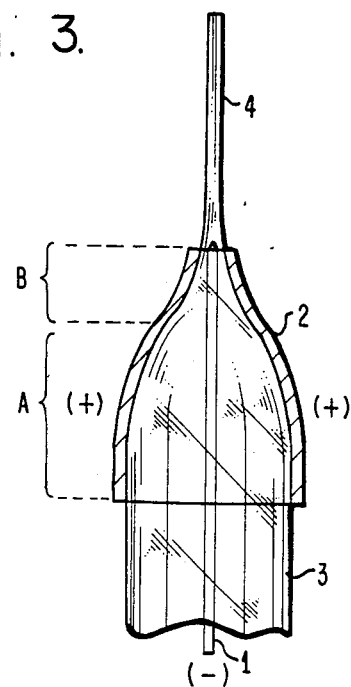
FIG. 3 depicts one embodiment of the present invention wherein a cathode is inserted into the core of the preform and a cylindrical anode surrounds the outer perimeter of said preform.
Figure 1:
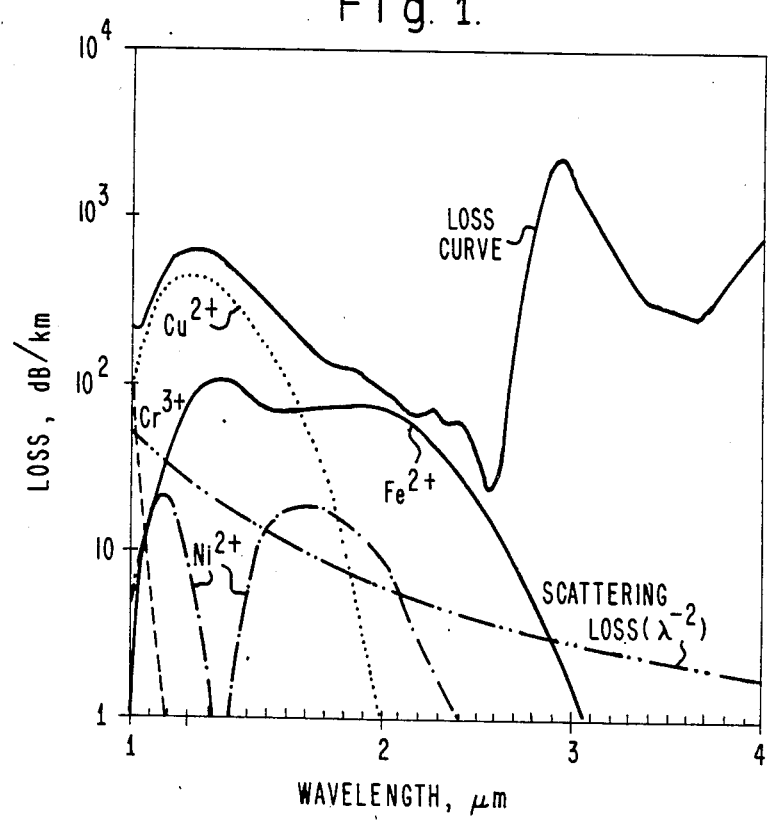
FIG. 1 is the transmission loss spectrum and loss factor analysis for a fluoride glass fiber as shown in FIG. 1 of Mitachi and Miyashita, Elect. Lett., 18, 170 (1982).

It should be noted that the process of the present invention can be utilized to modify the refractive index of a fluoride glass bulk preform, or a fiber when it is at the fiber drawing stage (as illustrated in FIG. 3). It should also be noted that the insertion of the electrodes is accomplished during the casting of the fluoride glass material into a preform. These insertions during casting are done to achieve good electrical contact.

The ions that make up a fluoride glass composition include $Zr^{4+}$, $Hf^{+4}$, $Ba^{+2}$, $La^{+3}$, $Al^{+3}$, etc., as well as some residual transition metal and anion impurities picked up when the mixture (glass) was made from its purified components. The electrolytic mobility of these ions, "$\mu$" can be defined as the ease with which ions move through a substance when they are subjected to electric field. It is precisely the electrolytic transport of these positive and negative ions within the fluoride glass composition that effectuate the change in the refractive index of the fluoride glass preform and/or fiber.

Generally, positive ions have a higher atomic number than that of the fluoride ion. Consequently, positive ions contribute more greatly, or aid in greater numbers, in changing the refractive index of a fluoride glass substance. The larger the size of an ion, the more opposition to transport, i.e., lesser mobility, it will encounter. Hence, the larger the ion, the lower the mobility. The size of an ion is determined by the extension of the electron cloud surrounding that ion. A neutral particle will become a positive ion when an electron is removed and, similarly, a neutral ion will become negative by adding an electron. Therefore, since a negative ion is larger, e.g., due to the additional electron, than its respective positive ion, it will have a lower mobilty ($\mu$). This difference in mobility, however, is counterbalanced by the fact that ions are not singly tranported in the material. More specifically, mutual electrical attraction causes a positive ion to drag with it a sphere of negative ions, and conversely. To illustrate these points, the process parameters important to electrolytic mobility will be hereinafter discussed.

Two process parameters important to electrolytic migration is temperature, "T", on which "$\mu$" depends exponentially, and the migration distance "d", which determines the time interval, "$\tau$", for electrolysis. The optimum combination of "T" and "d" is situated at the preform side of the region from whence the fiber is drawn. The feasibility of the process hinges on "$\tau$" which, in turn, depends (through "T") on the value of "$\mu$".

For example, if we were to presume that:
d=radial distance (in cm), across the preform or between the electrodes
V=voltage applied (volts)
$\mu$=ion mobility ($cm^2$ $volt^{-1}$ $sec^{-1}$)
$\tau$=time interval for electrolysis,
it is known that:
$d = \mu E \tau$ where $E=(V/d)$,
therefore,
$(d^2/\mu\tau) = V$.

To use the above equation, you must know $\mu$ independently. The value of V is limited (cf. what follows). Thus, the numerical relation between d (the thickness or diameter of the preform) and $\tau$, the length of time of electrolysis, is specified. The numerical relationship can be changed (through $\mu$) by T. Hence, the parameters of the process are T and d, or T and $\tau$.

The process of the instant invention is constrained by a $V \leq 3.5$ volt limit, since at voltages above 3.5 at 1000° K., the host ions of the fluoride glass melt would be plated out. In the case of a fluoride glass preform, the process would be limited to 3.5 volts at 500°–600° K.

| Material | d, cm | $\tau$, sec | T | $\mu$, $cm^2$ $volt^{-1}$ $sec^{-1}$ |
|---|---|---|---|---|
| fiber | $10^{-1}$ | <1 sec | 1000° K. | $>3 \times 10^{-3}$ |
| preform | 1 | $>10^3$ sec | 500° K. | $<3 \times 10^{-4}$ |

The value of "d" as shown in the foregoing table represents the typical size of the preform or fiber encountered in each case. We have adopted a value of "$\tau$" to represent the realistic residence time at a chosen "T" that is compatible with the process. A large value of "$\tau$" exists for the preform since the preform has a much larger diameter and a lower "T" can therefore be employed without incurring significant devitrification, i.e., formation of scattering centers. In the case of a fiber, a much lower value of "$\tau$" exists because drawing reduces the diameter and "T" must therefore be higher.

Electrolysis, pursuant to the instant invention, can be applied to the body of the preform, prior to and during the drawing process. The typical values of a fluoride glass preform are d=1 cm and $\tau > 10^3$ sec. Therefore, "$\mu$" at 500° K. will be less than $3 \times 10^{-4}$ $cm^2$ $volt^{-1}$ $sec^{-1}$. This essentially means that an ion whose value of "$\mu$" at 500° K. is $10^{-4}$ $cm^2$ $sec^{-1}$ $vol^{-1}$ will be plated out within the residence time of $\tau = 10^3$ sec.

If electrolysis is applied at the fiber drawing stage, typical values are $d=10^{-1}$ cm and $\tau < 1$ sec, due to the rapid quenching attending the actual drawing of the fiber. Therefore, "$\mu$" at 1000° K. is greater than $3 \times 10^{-3}$ $cm^2$ $volt^{-1}$ $sec^{-1}$. Therefore, at 1000° K., the positive ions must have a value of "$\mu$" greater than $10^{-3}$ $cm^2$ $volt^{-1}$ $sec^{-1}$ in order for there to be a migration of positive ions sufficient to result in a higher refractive index at the core in a time interval below 1 sec.

It should be noted that the fluid flow pattern of fiber drawing can assist ion migration and thereby shorten the transport time at 500° K. over the value of the static matrix. The preform is a static matrix at a region far removed from the constriction where the material is in a state of flow due to the drawing.

When an electromotive force is applied to the preform, in accordance with the instant invention, the ions migrate to the respective electrodes, e.g., positive ions migrate to the cathode and negative ions migrate to the anode. The positive ions that arrive at the cathode interface, accept electrons and thereby rendered neutral, while the negative ions donate electrons to the anode. As was discussed earlier, mutual electrical atttraction additionally causes a positive ion to drag with it a sphere of negative ions, and conversely. This enables metal ions to concentrate at the core region of the preform or fiber. Consequently, that region has a higher refractive index than the edge and serves as a boundary for confining (waveguiding) the light radiation along the axial (core) region. This bending effect cuts down the path of the light in the "clad region" which is more absorptive than the core because of the concentration of non-metal ion impurities such as $OH^-$ and $O^=$.

Figure 2:
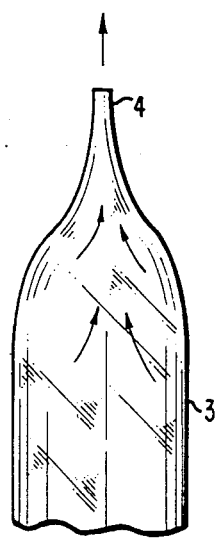
FIG. 2 depicts the fluid flow pattern in the fluoride glass preform during drawing which assists in the transport of ions.

FIG. 2 is of pedagogical value in illustrating the various principles associated with the present invention. FIG. 2 illustrates the fluid flow pattern of the fluoride glass preform depicted in FIG. 3. The fluid flow pattern, which occurs subsequent to fiber drawing, assists ion migration and thereby shortens the transport time of the positive ions to the inner core.

FIG. 3 is an illustration of one embodiment of the present invention, wherein the preform (3) is fitted with a cathode (1) along its inner core or axis and a cylindrically symmetrical anode (2) surrounding the outer perimeter of the preform. Region (A) corresponds to the preform example in the table on page 12 wherein the residence time $\tau$ exceeds $10^3$ sec. FIG. 3 illustrates the best mode contemplated by the present invention, for the most commonly used fluoride glass compositions. The transport of ions occur radially, with the metal ions migrating towards cathode (1) and the anions towards anode (2). Region (B) is an intermediate region close to the fiber, the other example in the table (cf. page 12). In region (B), ion transport is assisted by the flow of material subsequent to the drawing process. As remarked before, for clarity, we have not shown a small gap in the anode (2) which provides a window for laser irradiation (photoactivation), an additional feature of the present invention, to increase the ion-drift velocity as illustrated in FIG. 4.

An additional noteworthy feature of the present invention is that the refractive index of the preform may be modified to a desired level by changing the symmetry and/or the configuration of the electrodes to correspond to a preform symmetry that is other than the conventional cylindrical example. The index (n) profile can be changed by shifting from the continuously applied electric field to one that is pulsed. The decay time and shape of the pulse versus the drawing speed is an added parameter to the shaping of the profile. Reversing the polarity between pulses is also another degree of freedom in shaping the n-profile. The cylindrical symmetry of the electrode surrounding the outer perimeter of the preform may also be replaced by a rectangular symmetry in the preform and electrodes in order to achieve n-profiling of a ribbon, i.e., a flat fiber. Lastly, if a bromide-fluoride glass composition was contemplated, the polarity of the electrodes shown in FIG. 3 would be reversed since there is a greater increase in the refractive index at the core which is bromide rich.

Figure 4:
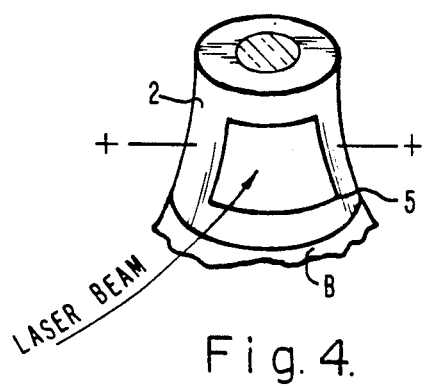
FIG. 4 depicts the neck region of the preform showing the electrode configuration to achieve cylindrical symmetry in the transport of ions. This figure additionally illustrates the photoactivated (by laser) assisted transport of ions.

FIG. 4 illustrates an additional feature of the present invention, wherein a small region (5) located directly in the region, and at the point where fiber formation is initiated, is irradiated utilizing a laser beam. It should be noted that in FIG. 4, the cathode is not shown to make illustration of this feature of the invention easier. Additionally, the window illustrated is only one method by which photoactivation by a laser can be utilized. Additional methods of photoactivation utilizing a laser can be achieved by creating a gap in the electrode surrounding the outer periphery of the preform. The gap in the electrode can exist around the entire perimeter of the preform forming a complete empty band around preform in order to achieve photoactivation by laser at the fiber drawing stage. Other methods of achieving photoactivation by a laser contemplated by the instant invention, and obvious to those skilled in the art, are hence not shown. The use of the laser to irradiate this region achieves a photoactivated ion-drift velocity.

Without laser excitation, the migrating ion is only thermally activated. Laser excitation causes internal activation. This results in the ions existing in a photo-activated state which contributes to their thermally activated condition. This heightened state of thermal activity leads to a larger ion-drift velocity.

Refractive index depends upon the density of the packing of the ions (cations and anions) of a material. In the case of fluoride glass, this dependence should proceed linearly, with the mole fraction as the weighting factor to the refractive-index contribution of each component. This feature should be appreciated in the following calculation which shows that the total volume of the glass is the sum of the volume of each component weighted by its mole fraction:

ZBT glass is nominally $0.60ZrF_4:0.07ThF_4:0.33BaF_2$ with a density of 4.8 g/cm$^3$ and $n_D=1.53$ [cf. M. Robinson, et.al., Mat. Res. Bull., 15, 735 (1980)]. The molecular weight (mw) and density (d) of each component is: $ZrF_4$. mw=167.21 and d=4.43 g/cm$^3$; $BaF_2$, mw=175.34 and d=4.89 g/cm$^3$; and $ThF_4$, mw=308.03 and d=6.32 g/cm$^3$. Now, were the molar volumes of the components added, weighted by the mole fraction, the molar volume of the fluoride glass is:

$$V_{FG}=(167.21/4.43)0.60+(308.03/6.32)0.07+(175.34/4.89)\times 0.33 = 37.891 \text{ cm}^3.$$

Now, the molecular weight of the fluoride glass is:

$$d_{FG}=179.75/37.891=4.74 \text{ g/cm}^3,$$

which is in good agreement with the value of 4.8 g/cm$^3$ for the nominal composition.

The literature value of "n" for $ZrF_4$ is 1.59; for $BaF_2$, 1.4741. A value, however, is not given for the $ThF_4$. However, its mole fraction 0.07 is small and therefore, it can be added to the value of $ZrF_4$. The mixture of $ThF_4$ and $ZrF_4$ will be called $MF_4$, i.e., $0.67MF_4$ and $0.33BaF_2$. Thus, the calculated value for the glass is, $n_{FG}=(1.59\times 0.67)+(1.4741\times 0.33)=1.55$, which is in good agreement with the observed value of 1.53 for the nominal composition given.

From the preceding result, the change in mole fraction of $MF_4$ ($\Delta x$) is related to the change in refractive index ($\Delta x$) as follows:

$$\Delta x = \Delta n/(1.59-1.4741),$$

or approximately, $$\Delta x \sim 10\Delta n.$$

Thus, a 10% increase in the mole fraction of the metal ion (esp. in $M^{+4}$) in the core region is more than sufficient. Moreover, based on the foregoing calculations, such a change is feasible. The movement of a region, across which there is a change in "n", is the basic of measurement of electric transport by the moving-boundary method. (See Chap. 12, especially Sec. 15 of, "Elementary Physical Chemistry," by H. S. Taylor and H. A. Taylor, Third Edition [Van Norstrand, 1942].)

Having thus described exemplary embodiments of the present invention, it should be noted by those skilled in the art that these embodiments are exemplary only and that various other alternatives, adaptations, and modifications may be made within the scope of the present invention.

What is claimed is:

1. A method of modifying the refractive index of a fluoride glass preform having an outer periphery and an inner core comprising:
   (a) heating the fluoride glass preform to a temperature that is above its glass transition temperature, but below its devitrification temperatue;
   (b) inserting a first electrode into the inner core of the preform and surrounding the outer perimeter of the preform with a second electrode of opposite polarity;
   (c) generating an electromotive force using a generating means; and
   (d) applying an electromotive force through the first electrode and the second electrode which causes a movement of positive ions toward the electrode of opposite charge while simultaneously causing a movement of negative ions toward its electrode of opposite charge such that the movement of these ions results in a modification of the refractive index of the preform.

2. The method of claim 1 further comprising a second electrode which surrounds the outer perimeter of the preform having an aperture, such that a laser beam directed through the aperture will provide irradiation, resulting in photoactivation of ions within the preform.

3. The method of claim 1 further comprising a first electrode and a second electrode such that the symmetry and configuration of such first and second electrode is modified to a predetermined arrangement in order to modify the refractive index of the preform to a desired level.

4. The method of claim 1 wherein the electromotive force generated is pulsed.

5. A method of modifying the refractive index of a fluoride glass preform having an outer periphery and an inner core comprising:
   (a) heating the fluoride glass preform to a temperature that is above its glass transition temperature, but below its devitrification temperatue;
   (b) inserting a cathode into the inner core of the preform and surrounding the outer perimeter of the preform with an anode;
   (c) generating an electromotive force using a generating means;
   (d) applying an electromotive force through the cathode and the anode which causes a movement of positive ions from the outer periphery of the preform toward the cathode at the inner core while simultaneously causing a movement of negative ions toward the anode at the outer periphery of the preform, such that a higher refractive index is thereby induced at the inner core of the preform than at its outer periphery.

6. The method of claim 5 further comprising an anode which surrounds the outer perimeter of the preform having an aperture, such that a laser beam directed through the aperture will provide irradiation, resulting in photoactivation of ions within the preform.

7. The method of claim 5 further comprising an anode and a cathode such that the symmetry and configuration of such anode and cathode is modified to a predetermined arrangement in order to modify the refractive index of the preform to a desired level.

8. The method of claim 5 wherein the electromotive force generated is pulsed.

9. The method of claim 7 wherein the anode and the cathode of a square configuration, thereby assisting in the production of a ribbon or flat fiber.

* * * * *

UNITED STATES PATENT AND TRADEMARK OFFICE
CERTIFICATE OF CORRECTION

PATENT NO. : 4,680,044
DATED      : July 14, 1987
INVENTOR(S) : Ricardo C. Pastor It is certified that error appears in the above-identified patent and that said Letters Patent is hereby corrected as shown below:

Column 9, line 6, "temperature" instead of "temperatue".

Column 10, line 6, "temperature" instead of "temperatue".

Signed and Sealed this

Fifth Day of April, 1988

*Attest:*

DONALD J. QUIGG

*Attesting Officer*   *Commissioner of Patents and Trademarks*